United States Patent Office 3,303,139
Patented Feb. 7, 1967

---

3,303,139
AMINOPHOSPHONIC ACIDS AND THEIR DERIVATIVES AS COMPLEX FORMERS FOR METAL IONS
Bruno Blaser, Dusseldorf-Urdenbach, Hans-Günther Germscheid, Hosel, and Karl-Heinz Worms, Dusseldorf-Holthausen, Germany, assignors to Henkel & Cie, G.m.b.H., Dusseldorf-Holthausen, Germany
No Drawing. Filed June 2, 1965, Ser. No. 460,809
2 Claims. (Cl. 252—180)

This is a continuation-in-part of our copending application Serial Number 252,316, filed January 18, 1963.

The invention relates to metal ion complex formers and, more particularly, to aminophosphonic acids which readily form such complexes.

It has been found that compounds having the Formulae 1 and 2, as shown below, are highly suited as complex formers for metal ions, especially for polyvalent metal ions.

Compounds of the kind have either of the following formulae:

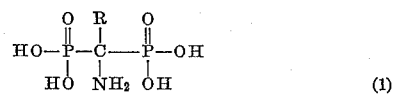

(1)

or

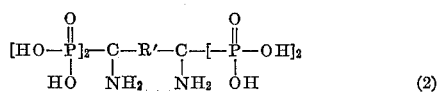

(2)

In both these formulae, R is a saturated or unsaturated aliphatic radical having 1–10 carbon atoms or a phenyl- or benzyl-radical. R′ is an aliphatic radical having 1–10 carbon atoms. Instead of these compounds may be used their semiesters or salts, such as methyl-, ethyl-, propyl-, butyl- and amyl-esters, respectively lithium-, sodium-, potassium-, ammonium-salts or salts of mono-, di- and triethanolamine, guanidine and urea.

Compounds of the generic Formula 1 are obtained by the reaction of phosphorus trihalides with organic nitriles. The reaction is carried out at temperatures ranging from 0 to 100° C., whereby substantially 2 mols phosphorus trihalide are employed per mol nitrile. After completion of the reaction or even during the reaction, organic acids, especially glacial acetic acid, or inorganic oxygen-containing substances, particularly phosphorous acid, are added. Thereafter, the product is hydrolized with water for the purpose of obtaining the free acids, or else, when producing the mono- or diesters, they are reacted with the suitable alcohols or phenols, if required, in the presence of acid-binding substances.

Compounds corresponding to the generic Formula 2 can be manufactured in a similar manner whereby, however, organic dinitriles are used in lieu of the nitriles. In these reactions, it is opportune to employ substantially 4 mols phosphorus trihalide per mol dinitrile.

The aminophosphonic acids named above can be utilized as complex formers in the most varied manners. For instance, with their aid calcium ions can be bound to a considerable extent, and this can successfully be used for the softening of water. The complex formation can also serve to descale textiles wherein, in the course of washing processes, alkaline earth salts have deposited, and simultaneously the ash content in such textiles can be diminished.

In cleaning processes, especially in bottle washing, the addition of these aminophosphonic acids also is of decided advantage in order to avert the precipitation of hardness formers, i.e., of substantially insoluble calcium and magnesium salts. In these processes, it should be noted, it is not required to apply stoichiometrical quantities since even substoichiometrical amounts are capable of considerably delaying precipitation. It has further been found that a particular advantage resides in the fact that if hardness formers precipitate at all, they solidify in a form which adheres to glass or metal only to a slight extent.

The capability of the aminophosphonic acids to form complexes also can be utilized to great advantage in systems wherein heavy metal ions, e.g., copper ions, have an undesirable effect. An example for this is the avoidance of the decomposition of per-compounds. Moreover, the aminophosphonic acids are suited as additives to dye baths for textiles in order to bind metal ions which are apt to impart undesirable hues.

Furthermore, the aminophosphonic acids, having at least two phosphorus atoms in the molecule and containing nitrogen, can readily be employed as preservatives against rancidity in the manufacture of soap.

Finally, the property of forming complexes can be taken advantage of in order to supply plants or animals with so-called trace elements.

The surprisingly strong capability of these compounds to form complexes also is established by the fact that in certain concentrations the Berlin or Prussian blue reaction typical for trivalent iron ions does not occur. In a like manner, the red coloration usually taking place upon addition of thiocyanate to trivalent iron, fails to materialize. Even thioglycolate complexes, e.g., those of iron, can be decolorized by the addition of small quantities of the aminophosphonic acids. Also, the formation of blue copper tetramine- and nickel-complexes is suppressed by the presence of the compounds named above. This property can be exploited industrially for inhibiting the deposit of iron, particularly of iron hydroxide, on textiles or in bottle washing processes. In the like manner, rust spots can be removed from textiles with these compounds.

In the applications named, the compounds according to the invention, as described above, are added in concentrations of 0.015 to 3 mols per metal ion to the solutions of the polyvalent complex-forming metal ions.

The compounds named above in detail can be employed in acid, neutral or alkaline solution. Frequently, it is advantageous in practice to use the water-soluble salts of the aminophosphonic acids in lieu of the acids themselves, or their semiesters, respectively. These salts can readily be prepared by neutralization of the acids with suitable basic compounds. Applicable salts are alkali salts, ammonium salts and also salts of organic bases, such as mono-, di- and triethanolamine, alkyl and arylamines, guanidine, urea, and others. All these compounds can be used as complex formers singly or in mixture.

The invention now will be further explained by the following examples. However, it should be understood that these are given merely by way of illustration, not of limitation, and that numerous changes may be made in the details without departing from the spirit and the scope of the invention as hereinafter claimed.

EXAMPLE 1

The capability of the compounds named above to bind calcites can be proved by influencing the foaming ability of soap solutions in hard water.

For that purpose, solutions first are prepared of 20 ml. water of 20° hardness and 2 drops of a soap solution according to Boutron and Boudet. To this, there are added 5 ml. of a molar soda solution.

The solutions thus prepared do not foam upon shaking. However, they do foam when an aqueous solution of the compounds according to the invention is added. The concentration of these solutions is chosen so that 0.4 g. $P_2O_5$ are present in 100 g. $H_2O$. When these quantities are used, the amount of milliliters solution used corresponds to the calcium titer. The latter is defined as the grams $P_2O_5$ which bind 1 g. calcium oxide. When all CaO is bound, no more insoluble calcium soaps are present, the solution is clear, and a stable foam forms upon shaking.

Table 1 shows the calcium titer of the above solutions after addition of the compounds as named therein.

Table 1

| Compound: | Calcium titer (ml. soln.) |
|---|---|
| 1-aminoethane-1,1-diphosphonic acid | 7 |
| 1-aminopropane-1,1-diphosphonic acid | 7 |
| 1-aminobenzyl-1,1-diphosphonic acid [1] | 5.5 |
| 1,6-diaminohexane-1,1,6,6-tetraphosphonic acid | 5.6 |
| 1-aminoethane-1,1-diphosphonic acid monoethyl-ester | 6.3 |
| 1-aminooctane-1,1-diphosphonic acid | 5.6 |
| 1-amino-2-phenylethane-1,1-diphosphonic acid [2] | 5.3 |

[1] The compound can also be named 1-amino-1-phenylmethane-1,1-diphosphonic acid and has the Formula 3:

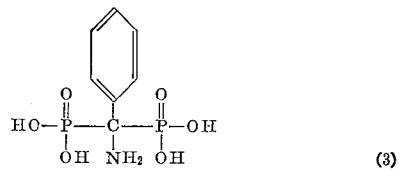

(3)

[2] The compound also can be called 1-amino-1-benzylmethane-1,1-diphosphonic acid and has the Formula 4:

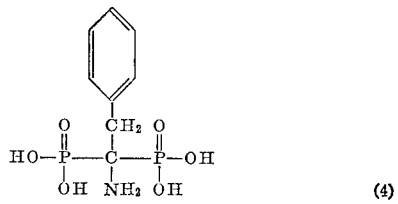

(4)

In lieu of the compounds named in Table 1, the corresponding sodium-, potassium-, ammonium-salts and those of mono-, di- and triethanolamine can be employed. Corresponding results also are obtained when instead of the acids their methyl-, ethyl-, propyl-, butyl- or amyl-semi-esters are used.

EXAMPLE 2

In order to compare the ability of preventing scale formation, solutions in tap water of a total hardness of 17.15° (carbonate hardness 10.50°) in a concentration of 10 mg./l. were prepared of pentasodiumtripolyphosphate, ethylenediamine tetraacetic acid (EDTA), and of 1-aminoethane-1,1-diphosphonic acid or of their sodium, potassium or ammonium salts, respectively. 100 ml. each of these solutions were adjusted to a pH of 9.0 and 10.0, respectively, with NaOH using a calomel (mercurous chloride) electrode, and were heated for one hour (including upheat time) at 80° C. in a thermostatically controlled vessel. The precipitate formed thereby was filtered immediately afterward, and the beakers were cleaned by spraying their walls with an approximately 1 percent aqueous ammonium carbonate solution. Precipitate still adhering to the beaker walls then was dissolved in dilute HCl. In that solution and in the filtrate, the hardness was determined by titration with EDTA. The values given in Table 2 denote the total precipitation in mg. CaO, the values in parentheses are those for the precipitate clinging to the beaker walls. The figures given are averages of two and four determinations, respectively.

Table 2

| Additive | pH 9 | pH 10 |
|---|---|---|
| 0 (Blank Test) | 6.00 (3.2) | 13.50 (6.1) |
| Pentasodiumtripolyphosphate | 0.90 (0.2) | 7.55 (2.25) |
| 1-aminoethane-1,1-diphosphonic acid | 0.65 (0.05) | 4.65 (1.35) |
| Ethylenediaminetetraacetic acid (EDTA) | 4.80 (2.3) | 13.20 (3.2) |

The amount of 1-aminoethane-1,1-diphosphonic acid added is 0.0163 mol per mol Ca.

EXAMPLE 3

Table 3 below shows the capability of the compounds named therein to form iron complexes in soda-alkaline solution, as compared to ethylenediaminetetraacetate (EDTA).

The molar proportions employed are 0.15 to 1 mol substance per mol Fe.

The following technique was used:

To 10 ml. of a 0.01 molar $FeCl_3$ solution, corresponding to 0.1 millimol Fe, 15 ml. of a solution containing 5 millimols $Na_2CO_3$ were added. To these solutions, increasing quantities of the complex formers named in Table 3 were added, and the mixture heated to boiling.

In lieu of the acids named in Table 3, their methyl-, ethyl-, propyl-, butyl- or amyl-esters can be used or the lithium-, sodium-, potassium-, ammonium-salts, also the salts of mono-, di- and triethanolamine, guanidine or urea.

Table 3

| Millimols | Substance | Precipitated $Fe(OH)_3$ |
|---|---|---|
| 0.1 | EDTA | +. |
| 0.5 | EDTA | +. |
| 1.0 | EDTA | Traces. |
| 0.03 | 1-aminoethane-1,1-diphosphonic acid | +. |
| 0.04 | ---do--- | None. |
| 0.1 | ---do--- | Do. |
| 0.01 | 1-aminopropane-1,1-diphosphonic acid | +. |
| 0.02 | ---do--- | None. |
| 0.05 | ---do--- | Do. |
| 0.02 | 1-aminobenzyl-1,1-disphosphonic acid.[1] | +. |
| 0.04 | ---do--- | Slightly cloudy. |
| 0.05 | ---do--- | None. |
| 0.01 | 1,6-diaminohexane-1,1,6,6-tetraphosphonic acid. | Cloudy. |
| 0.015 | ---do--- | None. |
| 0.02 | ---do--- | Do. |
| 0.01 | 1-aminoethane-1,1-diphosphonic acid monoethyl ester. | +. |
| 0.02 | ---do--- | Cloudy. |
| 0.03 | ---do--- | None. |
| 0.05 | ---do--- | Do. |
| 0.008 | 1-aminooctane-1,1-diphosphonic acid. | +. |
| 0.016 | ---do--- | None. |
| 0.04 | ---do--- | Do. |
| 0.05 | 1-aminopropene-(2)-1,1-diphosphonic acid. | +. |
| 0.1 | ---do--- | None. |
| 0.05 | 1,4-diaminobutane-1,1,4,4-tetraphosphonic acid. | +. |
| 0.1 | ---do--- | None. |
| 0.01 | 1-amino-2-phenylethane-1,1-diphosphonic acid.[2] | +. |
| 0.02 | ---do--- | Slightly cloudy. |
| 0.03 | ---do--- | None. |

[1] The compound has Formula 3, see Table 1.
[2] The compound has Formula 4, see Table 1.

EXAMPLE 4

Table 4 shows the complex formation with copper in soda-alkaline solution, as compared with ethylenediaminetetraacetate (EDTA). The molar proportions employed are 0.1 to 0.8 mol substance per mol Cu. The technique used was identical to that employed in Example 3, except that, in lieu of a 0.01 molar $FeCl_3$-solution, a 0.01 molar $CuSO_4$-solution was used.

Table 4

| Millimols | Substance | Precipitated CuO+ |
|---|---|---|
| 0.1 | EDTA | +. |
| 0.2 | EDTA | +. |
| 0.25 | EDTA | Slight precipitation. |
| 0.3 | EDTA | Clear. |
| 0.02 | 1-aminoethane-1,1-diphosphonic acid | +. |
| 0.03 | do | Cloudy when cold. |
| 0.04 | do | None. |
| 0.01 | 1-aminopropane-1,1-diphosphonic acid. | Cloudy. |
| 0.02 | do | None. |
| 0.04 | do | Do. |
| 0.01 | 1-aminobenzyl-1,1-diphosphonic acid.[1] | +. |
| 0.02 | do | None. |
| 0.04 | do | Do. |
| 0.03 | 1,6-diaminohexane-1,1,6,6-tetraphosphonic acid. | +. |
| 0.05 | do | Cloudy. |
| 0.1 | do | None. |
| 0.03 | 1-aminoethane-1,1-diphosphonic acid monoethylester. | +. |
| 0.05 | do | Greenish-yellow discoloration. None. |
| 0.1 | do | None. |
| 0.025 | 1,4-diaminobutane-1,1,4,4-tetraphosphonic acid. | +. |
| 0.04 | do | None. |
| 0.05 | do | Do. |
| 0.02 | 1-aminopropene-(2)-1,1-diphosphonic acid. | +. |
| 0.05 | do | Greenish-yellow discoloration. None. |
| 0.08 | do | None. |
| 0.03 | 1-amino-2-phenylethane-1,1-diphosphonic acid.[2] | +. |
| 0.04 | do | Greenish-yellow discoloration. |
| 0.05 | do | None. |

[1] The compound has Formula 3, see Table 1.
[2] The compound has Formula 4, see Table 1.

In lieu of the compounds named in Table 4, the corresponding methyl-, ethyl-, propyl-, butyl- and amyl-semiesters can be used, also the lithium-, sodium-, potassium-, and ammonium-salts; further the salts of mono-, di- and triethanolamine and of urea and guanidine.

EXAMPLE 5

The decoloration of the iron thioglycolate complex was tested as follows:

To 5 ml. of a 0.01 molar $FeCl_3$-solution, 5, 10 and 15 ml., respectively, of a 0.03 molar thioglycol solution were added, and the pH adjusted with 2, 3 and 4 ml., respectively, of a molar soda solution. In order to remove the deep red color, 0.5; 0.8; and 1.3 ml.; respectively, of a 0.1 molar 1-aminoethane-1,1-diphosphonic acid solution or of a 0.1 molar solution of the lithium-, sodium-, potassium- or ammonium-salt of that acid were required. The pH did not change during these additions.

The quantity of 1-aminoethane-1,1-diphosphonic acid added correponds to 1 to 2.6 mols substance per mol Fe.

EXAMPLE 6

To solutions containing metal ions listed in Table 5 below, small quantities of aminophosphonic acids in solution or their methyl-, ethyl-, propyl-, butyl- or amyl-esters or their sodium-, potassium- or ammonium-salts were added continuously. The acids also are listed in Table 5. The point was determined at which the polyvalent metal ions were completely bound by the additive. To establish that point, Eriochrome black T was used as indicator, anl the pH was held at 10. This procedure was applicable to such metal ions as, e.g., magnesium, calcium and zinc. For the determination of copper ions, Murexid was used as indicator in lieu of the Eriochrome T, and the pH was 8. In the case of trivalent iron, the determination was carried out in a hydrochloric acid solution using thiocyanate as indicator.

Table 5 shows the consumption in these titrations, calculated in gram mols compound versus gram atoms metal.

Table 5

| Metal Ions | Aminophosphonic Acid | Consumption, g. mols/g. atoms metal |
|---|---|---|
| $Mg^{2+}$ | 1-aminoethane-1,1-diphosphonic acid | 1.4 |
| $Ca^{2+}$ | do | 0.7 |
| $Cu^{2+}$ | do | 0.9 |
| $Fe^{3+}$ | do | 1.0 |
| $Ca^{2+}$ | 1-aminopropane-1,1-diphosphonic acid | 0.75 |
| $Cu^{2+}$ | do | 0.92 |
| $Fe^{3+}$ | do | 1.22 |
| $Ca^{2+}$ | 1-aminobenzyl-1,1-diphosphonic acid [1] | 0.7 |
| $Zn^{2+}$ | do | 2.36 |
| $Cu^{2+}$ | do | 0.96 |
| $Fe^{3+}$ | do | 1.48 |
| $Fe^{3+}$ | 1-aminodecane-1,1-diphosphonic acid | 3.0 |
| $Ca^{2+}$ | 1-amino-2-phenylethane-1,1-diphosphonic acid.[2] | 2.0 |
| $Fe^{3+}$ | do | 2.0 |

[1] The compound has Formula 3—see Table 1.
[2] The compound has Formula 4—see Table 1.

EXAMPLE 7

Textiles having rust spots approximately 2 years old were boiled for approximately 10 minutes in 2 percent solutions of aqueous 1-aminoethane-1,1-diphosphonic acid having pH values of 1.5 and 5, respectively. The pH in each case was adjusted with NaOH, KOH or $NH_4OH$. The rust spots thereby disappeared. In another textile having fresh rust spots, the treatment was effective after approximately 3 minutes.

EXAMPLE 8

A solution was prepared having the following composition:

|  | G. |
|---|---|
| $K_4P_2O_7$ | 203 |
| Sodium-p-toluenesulfonate | 94 |
| Tetrapropylenebenzenesulfonate, 70% | 170 |
| KOH | 12 |
| Ethanol, 95% | 23 |
| Ethoxylated coconut fatty acid monoethanol-amide | 46 |
| Water | 406 |

To this solution 35% $H_2O_2$ was added until the active oxygen content corresponded to the values given in Table 6 below. In a comparative experiment, the amount given in Table 6 of aminoethane-1,1-diphosphonic acid was added. Table 6 shows the active oxygen content at the start and after a given time for both these solutions.

Table 6

| Aminophosphonic Acid Added, g./l. | Percent Active Oxygen | |
|---|---|---|
|  | At Start | After 1 Month at 20° C. |
| 0.0 | 1.50 | 0.19 |
| 5 | 1.50 | 1.25 |

We claim as our invention:

1. A process for forming metal complexes which comprises adding to aqueous solutions of bi- and trivalent complex-forming metal ions 0.015 to 3 mols per mol metal ion of a substance selected from the group consisting of

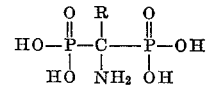

and

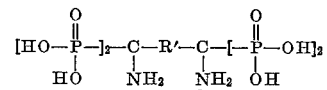

their methyl-, ethyl-, propyl-, butyl- and amyl-semiesters; and their lithium-, sodium-, potassium-, ammonium-, mono-, di- and triethanolamine, guanidine- and urea-salts; wherein R is selected from the group consisting of an alkyl having 1 to 10 C-atoms, phenyl and benzyl; and R' is an alkyl having 1 to 10 C-atoms.

2. A process for forming metal complexes which comprises adding to aqueous solutions of bi- and trivalent complex-forming metal ions, at substantially room temperature up to substantially 100° C., 0.015 to 3 mols per mol metal ion of a substance selected from the group consisting of

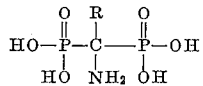

and

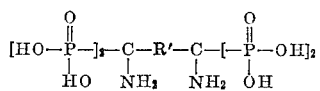

their methyl-, ethyl-, propyl-, butyl- and amyl-semiesters; and their lithium-, sodium-, potassium-, ammonium-, mono-, di- and triethanolamine, guanidine- and urea-salts; wherein R is selected from the group consisting of an alkyl having 1 to 10 C-atoms, phenyl and benzyl; and R' is an alkyl having 1 to 10 C-atoms.

References Cited by the Examiner
UNITED STATES PATENTS 3,214,454   10/1965   Blaser et al. _____ 252—180

FOREIGN PATENTS 1,002,355   7/1957   Germany.
1,082,235   5/1960   Germany.

LEON D. ROSDOL, *Primary Examiner.*

ALBERT T. MEYERS, *Examiner.*

J. T. FEDIGAN, *Assistant Examiner.*